United States Patent
Isson et al.

(10) Patent No.: US 11,442,133 B2
(45) Date of Patent: Sep. 13, 2022

(54) METHOD AND SYSTEM FOR GEOLOCATION OF GROUP-EVOLVING TERMINALS

(71) Applicant: SIGFOX, Labege (FR)

(72) Inventors: Olivier Isson, Saint-Orens de Gameville (FR); Renaud Marty, Ramonville Saint Agne (FR); Sofiane Dhouib, Villeurbanne (FR)

(73) Assignee: SIGFOX, Labege (FR)

( * ) Notice: Subject to any disclaimer, the term of this patent is extended or adjusted under 35 U.S.C. 154(b) by 87 days.

(21) Appl. No.: 16/982,541

(22) PCT Filed: Mar. 20, 2019

(86) PCT No.: PCT/EP2019/056917
§ 371 (c)(1),
(2) Date: Sep. 19, 2020

(87) PCT Pub. No.: WO2019/180063
PCT Pub. Date: Sep. 26, 2019

(65) Prior Publication Data
US 2021/0003657 A1 Jan. 7, 2021

(30) Foreign Application Priority Data
Mar. 21, 2018 (FR) ...................... 18 52429

(51) Int. Cl.
*G01S 5/00* (2006.01)
*G01S 5/02* (2010.01)

(52) U.S. Cl.
CPC .......... *G01S 5/0009* (2013.01); *G01S 5/0268* (2013.01)

(58) Field of Classification Search
CPC .............................. G01S 5/0009; G01S 5/0268
See application file for complete search history.

(56) References Cited

U.S. PATENT DOCUMENTS

2012/0184287 A1 7/2012 Jovicic et al.
2013/0080457 A1* 3/2013 Narayanan ............ H04W 4/023
707/758

(Continued)

FOREIGN PATENT DOCUMENTS

EP 3467839 A1 * 4/2019 ............. G06Q 10/10
WO 2015/188324 A1 12/2015

(Continued)

OTHER PUBLICATIONS

Tanbo et al., "Active RFID Attached Object Clustering Method Based on RSSI Series for Finding Lost Objects," 2015 IEEE 2nd World Forum on Internet of Things (WF-IOT), Dec. 14, 2015, pp. 363-368, IEEE.

(Continued)

*Primary Examiner* — Khai M Nguyen
(74) *Attorney, Agent, or Firm* — Ipside; C. Andrew Im; Jean-Christophe Hamann (57) ABSTRACT

A method for estimating the geographical position of a terminal of interest, among a panel of terminals of a wireless communication system. For each terminal of the panel, a time signature including values measured for each terminal during a predetermined observation period is determined. Values of similarity between the time signatures of the terminals of the panel is calculated, a similarity value calculated for two terminals representing the probability of the terminals being moved together or having been located at the same place during the observation period. Various terminals of the panel are partitioned into different groups depending on the similarity values. The geographical position of the terminal of interest is estimated as a function of the available geolocation data for at least one other terminal of the group to which the terminal of interest belongs.

13 Claims, 3 Drawing Sheets

(56) References Cited

U.S. PATENT DOCUMENTS

| | | | | |
|---|---|---|---|---|
| 2018/0167774 A1* | 6/2018 | Hodge | ................. | H04W 4/029 |
| 2019/0052995 A1* | 2/2019 | Agrawal | ................ | H04B 17/30 |
| 2019/0178657 A1* | 6/2019 | Benbrahim | ............ | G06Q 50/01 |
| 2019/0244498 A1* | 8/2019 | Dumas | ............. | G08B 13/19656 |

FOREIGN PATENT DOCUMENTS

| | | | | |
|---|---|---|---|---|
| WO | WO-2015188324 A1 * | 12/2015 | ............ | H04W 64/00 |
| WO | WO-2017133627 A1 * | 8/2017 | | |

OTHER PUBLICATIONS

Ye et al., "WarpMap: Accurate and Efficient Indoor Location by Dynamic Warping in Sequence-Type Radio-Map," 2016 13th Annual IEEE International Conference on Sensing, Communication, and Network (SECON), Jun. 27, 2016, pp. 1-9, IEEE.

* cited by examiner

METHOD AND SYSTEM FOR GEOLOCATION OF GROUP-EVOLVING TERMINALS

RELATED APPLICATIONS

This application is a § 371 application of PCT/EP2019/056917 filed Mar. 20, 2019, which claims priority from French Patent Application No. 18 52429 filed Mar. 21, 2018, each of which is incorporated herein by reference in its entirety.

TECHNICAL FIELD

The present invention belongs to the field of geolocation. In particular, the invention relates to a method and a system for geolocating a terminal of a wireless communication system. The invention can be applied particularly well to the geolocation of smart objects of the "Internet of Things" (or IoT) type that have a propensity to move in a group.

BACKGROUND OF THE INVENTION

Over the last few years, the increasing use of wireless communication systems has naturally led to developing services based on the geographical position of an object and used for example for navigation assistance, traffic management, tracking the delivery of merchandise, etc.

The satellite positioning systems such as GPS ("Global Positioning System") are among the most well-known geolocation techniques. These systems are based on the use by a receiver terminal of radio signals emitted by dedicated satellites. Geolocation by satellite is particularly precise, but it suffers from several disadvantages, in particular the cost and the electricity consumption induced by the integration of a GPS receiver in an object, as well as its lack of performance in closed zones.

Other techniques exist for geolocating a terminal on the basis of signals exchanged with the base stations of an access network to which it is connected. In cellular networks, such as GSM ("Global System for Mobile Communications"), it is known to estimate the position of a terminal as being that of the base station with which it is currently associated. This method has, however, a mediocre geolocation precision since the zone of coverage of a base station can reach several kilometers, or even several tens of kilometers in radius.

Other methods involve estimating the distances that separate a terminal from several base stations by calculating arrival times, propagation angles or differences in frequency for the signals exchanged between the terminal and the base stations. These various methods all have, however, the disadvantage of requiring specific hardware and software. Indeed, they generally require a synchronization of the terminals and/or of the various base stations acting as observation points. Moreover, they are particularly sensitive to the phenomenon called multipath (propagation of the same radio signal by several paths because of phenomena of reflection, refraction and diffraction on the obstacles encountered).

Other geolocation methods are based on the Received Signal Strength Indicator (RSSI) level of a signal exchanged between a terminal and a base station. These methods are particularly well adapted to the wireless communication systems of the cellular network type (such as GSM) for which the RSSI information is directly available since it is used by the communication system itself. These methods are based on the fact that a radio signal is attenuated in the atmosphere and thus that the RSSI level of a signal received by a receiver varies according to the distance that separates the receiver from the emitter of the signal. Thus, it is possible to determine the geographical position of a terminal by trilateration by estimating the distance separating the terminal from the various base stations that surround it on the basis of the RSSI levels measured by the base stations. The disadvantage of such a method for geolocation by trilateration based on the RSSI levels is its lack of precision due to the fact that the numerous parameters that influence the attenuation of the signal (obstacles, radio interference, position and movement of the terminal, etc.) make the function that defines the distance on the basis of an RSSI level very complex.

New geolocation methods based on the RSSI levels have thus been developed. These new methods are based on machine learning techniques. Concretely, this involves building, during a calibration phase, a database that associates, with known geographical positions, a radio signature corresponding to all of the RSSI levels measured for a terminal at a known position for a set of base stations of the system. Then, during a search phase, a radio signature observed for a terminal located at an unknown position is compared to all of the signatures of the database in order to estimate the position of the terminal on the basis of the position(s) corresponding to the most similar signature(s).

To carry out the calibration phase, it is known to place onboard, in a fleet of vehicles that travel across the geographical zone to be covered, apparatuses adapted to precisely provide the geographical position and the RSSI levels for the base stations of the communication system at various points (this phase is called "war-driving"). The greater the number of points, the better the performance of the geolocation method in terms of precision, but the longer and the more costly the calibration phase.

Such methods for geolocation by machine learning on the basis of radio signatures have, however, several disadvantages, in particular in the case in which the geographical zone to be covered is vast, for example if an entire country, or even a continent, must be covered. A first disadvantage relates to the geolocation precision. Indeed, it happens that two radio signatures corresponding to two neighboring geographical positions are significantly different, or that two particularly similar radio signatures correspond to two distant geographical positions. The establishment of a relationship between a radio signature and an associated geographical position is thus made difficult because of the noise generated by such situations. Another disadvantage relates to the complexity of the machine learning algorithm used. Indeed, to obtain sufficient precision, it is necessary to insert a large number of elements into the database built during the calibration phase. Moreover, if the zone to be covered is vast, there is a large number of base stations to take into account. All this contributes to considerably increasing the data at the input of the machine learning algorithm, and thus to creating constraints of capacity and calculation time.

OBJECT AND SUMMARY OF THE INVENTION

The goal of the present invention is to overcome all or a part of the disadvantages of the prior art, in particular those disclosed above, by proposing a method for geolocating a terminal of a wireless communication system, the performance of which in terms of precision and complexity are improved by being based on the idea that terminals of the system can move in groups.

The conventional geolocation methods using a radio signature of a terminal to estimate its geographical position are indeed concentrated only on information related to a relationship existing between the terminal and an access network of the communication system, such as RSSI levels or propagation times of signals exchanged between the terminal and the access network.

The geolocation method proposed by the present invention differs from the prior art insofar as it uses in addition the information coming from the terminals of the system which allows to determine for example whether a terminal, the geographical position of which it is sought to estimate, has moved in a group with other terminals during a certain period of observation. If this is the case, it is for example possible to estimate the geographical position of said terminal by using information relative to other terminals of the group.

The present invention has a particularly advantageous, although in no way limiting, use in the field of transport of merchandise. It is for example possible to equip palettes used for the transport of merchandise with terminals of a wireless communication system in order to be able to geolocate them. Such palettes indeed have a certain propensity to be moved in a group.

Thus, according to a first aspect, the present invention proposes a method for estimating the geographical position of a terminal, called "terminal of interest", from a panel of terminals of a wireless communication system. Said method comprises:
  determining, for each terminal of said panel, a time signature comprising values representative of phases of mobility of said terminal measured independently by the terminal by at least one sensor of the terminal during a predetermined observation period,
  calculating values of a criterion of similarity between the time signatures of the terminals of the panel, a value of said criterion of similarity calculated for two terminals being representative of the probability of said terminals having moved together or having been located at the same location during said period of observation,
  partitioning the various terminals of the panel into various groups according to the values of the criterion of similarity,
  estimating the geographical position of the terminal of interest according to geolocation data available for at least one other terminal of the group, called "group of interest", to which the terminal of interest belongs.

The panel of terminals can for example be determined by a selection of the terminals of the system for which it is known a priori that they are close to the terminal of interest (for example if they are covered by at least one base station of the wireless communication system that also covers the terminal of interest), or that they have a certain propensity to belong to a group of several terminals with which they have similarities.

A time signature of a terminal corresponds to a set of values measured independently by the terminal using a sensor of the terminal such as a motion sensor.

"Independently" means that the measurements representative of phases of mobility of the terminal carried out by the terminal to form a time signature do not depend on the behavior of another device. In particular, an RSSI measurement is not a measurement carried out independently by the terminal since such a measurement depends on the emission of a signal by another device, such as a base station. According to another example, a geographical position measured on the basis of a radio signal emitted by one or more satellites of a satellite positioning system is also not a measurement carried out independently by the terminal.

If two time signatures for two terminals have significant similarities, this means that the two terminals in question probably moved together, or possibly that they remained in the same location, during the observation period.

The partitioning of the various terminals of the panel into various groups allows to improve the geolocation of a terminal of interest, the geographical position of which is sought to be estimated. Indeed, it is for example possible to estimate the geographical position of said terminal of interest if the geographical position of at least one of the terminals of the group is known precisely, for example if one of the terminals of the group is equipped with a GPS receiver. According to another example, it is possible to estimate the geographical position of said terminal by correlating estimated positions of several terminals of the group. In certain cases, it is possible to estimate the geographical position of said terminal of interest by correlating geolocation data (for example GPS positions, and/or estimated positions, etc.) relative to several terminals of several different groups. It should be noted that this geolocation data can be information that does not directly correspond to a geographical position but which allows to determine or to estimate a geographical position (for example propagation times of a signal or RSSI levels used by trilateration methods, etc.).

In specific embodiments, the invention can further comprise one or more of the following features, taken alone or according to all the technically possible combinations.

In specific embodiments, the values measured to determine a time signature of the terminal comprise:
  values measured by at least one sensor of said terminal during the observation period, and/or
  radio signatures comprising values representative of the quality of radio links existing between the terminal and one or more base stations of the wireless communication system at various times during the observation period.

In specific embodiments, the values representative of phases of mobility of the terminal measured by at least one sensor of said terminal comprise:
  values measured by a motion sensor, and/or
  values measured by a temperature sensor, and/or
  values measured by an atmospheric pressure sensor, and/or
  values measured by a luminosity sensor, and/or
  values measured by a magnetic-field sensor.

Indeed, according to the type of use considered, various environmental data can be used to determine whether terminals have moved together during a period of observation. For example, if the environmental conditions observed for two distinct terminals are similar, this means that said terminals were probably "co-located" during the period of observation.

In specific embodiments, a time signature of a terminal further comprises radio signatures comprising values representative of the quality of radio links existing between the terminal and one or more base stations of the wireless communication system at various times during the observation period, and the similarity criterion is determined according to a similarity criterion relative to the phases of mobility and a similarity criterion relative to the radio signatures.

For example, a time signature can comprise values representative of the phases of mobility of a terminal during the period of observation determined for example using a motion sensor such as an accelerometer or a gyroscope. In addition, a time signature can comprise radio signatures of a terminal determined various times during the period of observation. If the time signatures of two terminals are similar, in other words if the values and/or the radio signatures that form them fulfill certain conditions of similarity, then the two terminals can probably be considered to belong to the same group of terminals which moved together during the period of observation.

In specific embodiments, a similarity criterion is determined according to a weighting factor assigned to a measured value representative of the time that has passed between the time at which said value is measured and the time of estimation of the geographical position of the terminal of interest.

Such arrangements allow to give more importance to the recent data of a time signature. Indeed, if for example two terminals moved together during only a part of the period of observation, more importance should be given to the recent data in order to determine whether at the end of the period of observation, that is to say at the time at which the estimation of the geographical position of the terminal of interest is carried out, the terminals in question are together or not, that is to say whether or not it should be considered that they belong to the same group.

In specific embodiments, the partitioning of the various terminals of the panel is carried out so that each terminal belongs at most to one group.

Such a partitioning is for example carried out by methods for grouping together elements known as "hard clustering", for which each element belongs to a single group, or it does not belong to any group (isolated element).

In specific embodiments, the partitioning of the various terminals of the panel is carried out so that each terminal belongs to each group according to a value of probability of belonging, the group of interest corresponding to the group for which the value of probability of belonging of the terminal of interest is the greatest.

Such a partitioning is for example implemented by methods for grouping tougher elements known as "soft clustering", for which each element belongs to several groups to a certain degree defined by probabilistic methods.

In specific embodiments, the geographical position of the terminal of interest is estimated according to geolocation data available for various terminals belonging to various groups and according to the values of probability of the terminal of interest belonging to the various groups.

In specific embodiments, said geolocation data is provided by a terminal in the form of a geographical position obtained by a satellite positioning system of said terminal.

If certain terminals of the system are equipped with a GPS receiver, it can be possible to determine the geographical position of the terminal of interest using a GPS position provided by one of the terminals of the group of interest to which the terminal of interest belongs, or using several GPS positions provided by several terminals of the group of interest, or even using several GPS positions provided by several terminals of several different groups.

In specific embodiments, the geolocation data is available for a terminal in the form of a radio signature comprising values representative of the quality of radio links existing between said terminal and one or more base stations of the wireless communication system.

In specific embodiments, a geographical position of a terminal of the panel is estimated according to the radio signature of said terminal and a reference set comprising radio signatures associated with known geographical positions. The geographical position of the terminal of interest is thus estimated according to the estimated geographical position of at least one other terminal of the group of interest.

This reference set is for example a database memorizing reference elements, used by a machine learning algorithm. Each reference element is thus a pair of pieces of information consisting on the one hand of a radio signature, and on the other hand of a known geographical position associated with this radio signature. The learning algorithm allows to estimate the position of a terminal of interest on the basis of a radio signature of said terminal of interest, and using the reference database. To reduce the complexity of the geolocation method, it can thus be sufficient to estimate the geographical position of a single terminal of a given group and consider that all the terminals of the group have the same geographical position.

According to another example, to improve the precision of the geolocation method, it can be advantageous to correlate the estimated geographical positions of several terminals of the group of interest in order to refine the geographical position of each terminal of the group, and in particular that of the terminal of interest.

In specific embodiments, a virtual radio signature is determined for the group of interest according to the radio signatures of the terminals belonging to said group of interest, and the position of the terminal of interest is estimated according to said virtual radio signature.

In this case this involves for example correlating the radio signatures of several terminals of the group of interest to determine a virtual radio signature used to estimate a geographical position that is attributed to all the terminals of the group, and in particular to the terminal of interest.

In specific embodiments, said panel of terminals is determined by a step of selection among the terminals of the wireless communication system so that a terminal of the panel is covered by at least one base station of the wireless communication system also covering the terminal of interest.

According to a second aspect, the present invention relates to a wireless communication system comprising terminals, and an access network comprising base stations and a server connected to said base stations. Said system implements a method for geolocation of a terminal of interest, from a panel of terminals, according to any one of the preceding embodiments. Said server is configured to:
    collect values representative of phases of mobility of a terminal of said panel, measured independently by said terminal by at least one sensor of the terminal during a predetermined observation period,
    determine a time signature for said terminal on the basis of the measured values,
    calculate values of a criterion of similarity between the time signatures of the terminals of the panel, a value of said similarity criterion calculated for two terminals being representative of the probability of said terminals having moved together during said period of observation,
    partition the various terminals of the panel into various groups according to the values of the similarity criterion,
    estimate the geographical position of the terminal of interest according to geolocation data available for at least one other terminal of the group, called "group of interest", to which the terminal of interest belongs.

BRIEF DESCRIPTION OF THE DRAWINGS

The invention will be better understood upon reading the following description, given as an example that is in no way limiting, and made in reference to FIGS. 1 to 7 which represent.

In these drawings, references identical from one drawing to another designate identical or analogous elements. For reasons of clarity, the elements shown are not necessarily on the same scale, unless otherwise mentioned.

DETAILED DESCRIPTION OF EMBODIMENTS

The following description describes as an example and in a non-limiting manner several embodiments of the invention.

1. The Context

In the rest of the description, in a non-limiting manner the case is considered in which terminals of the smart object type of a wireless communication system are fastened to palettes of merchandise with the goal of being able to geolocate them. Such palettes are generally moved in a group, according to the destination of the merchandise that they comprise.

Figure 1:
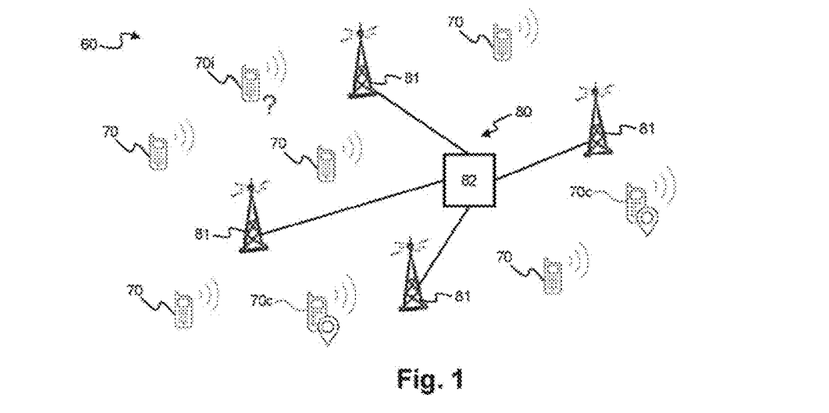
FIG. 1: a diagram of a wireless communication system.

FIG. 1 schematically shows a wireless communication system 60, comprising terminals 70 and an access network 80 comprising for example a plurality of base stations 81 connected to a server 82.

The terminals 70 and the base stations 81 exchange data in the form of radioelectric signals. "Radioelectric signal" means an electromagnetic wave propagating in free space, the frequencies of which are comprised in the conventional spectrum of the radioelectric waves (several hertz to several hundred gigahertz).

The exchanges of data between a terminal 70 and the base stations 81 are for example bidirectional. In other words, a terminal 70 is adapted to emit data over an upstream link to the base stations 81, and to receive data over a downstream link from said base stations 81 to said terminal 70.

Nothing, however, excludes, according to other examples, having unidirectional exchanges, only over the upstream link. Numerous uses of the IoT type involve collection of data emitted by terminals 70 and make do perfectly with exchanges only over the upstream link between each terminal 70 and the base stations 81.

According to a non-limiting example, the wireless communication system 60 is Ultra Narrow Band. "Ultra Narrow Band" (UNB) means that the instantaneous frequency spectrum of the signals emitted by the terminals 70 has a frequency width of less than two kilohertz, or even less than one kilohertz. Such arrangements are particularly advantageous in that the emission of such signals can be carried out with a greatly reduced electricity consumption, particularly adapted to uses of the IoT type.

Each base station 81 is adapted to receive messages emitted by terminals 70 which are within its range. Each message thus received is for example transmitted to the server 82 of the access network 80, optionally accompanied by other information such as an identifier of the base station 81 that received it, a value representative of the quality of the radio signal carrying the message, the central frequency on which the message was received, a date on which the message was received, etc. The server 82 processes for example all of the messages received from the various base stations 81.

To estimate the geographical position of a terminal 70, called "terminal 70$i$ of interest," it is known for example to use a geolocation method based on machine learning algorithms seeking to establish a relationship between a radio signature of a terminal and the geographical position of said terminal. The server 82 can in particular be used for the implementation of such a geolocation method.

In the rest of the description, as an example that is in no way limiting, the case is considered in which the invention improves such an existing geolocation method based on a machine learning algorithm that aims to establish a relationship between a radio signature of a terminal and the geographical position of said terminal.

It should be noted, however, that there are other methods for estimating the position of a terminal 70$i$ of interest, and in particular methods that are not necessarily based on machine learning algorithms, such as trilateration methods that allow to determine a geographical position on the basis of calculations of Time Difference of Arrival (TDOA) of a signal. The method according to the invention can also be applied to such methods.

In the rest of the description, "geographical position" means a set of two coordinates corresponding to the latitude and the longitude, respectively. It should be noted that alternatives are possible for defining a geographical position. For example, a third coordinate corresponding to the altitude with respect to the average sea level could also be taken into account.

The radio signature of a terminal 70 is for example determined during the emission of a message from said terminal 70 to the access network 80. For example, the radio signature comprises a set of values corresponding to levels of received average power (RSSI) measured by the various base stations (for example in decibels) upon reception of said message. For the base stations 81 that have not received the message, for example because the terminal 70 is too far and is not within their radio coverage, a default value of −160 dB is for example used.

It should be noted that other methods are possible for determining a radio signature. For example, other values representative of the quality of the radio links existing between a terminal 70 and the base stations 81 during the emission of a message could be used to determine a radio signature, such as a Signal-to-Noise Ratio (SNR) or a Channel Quality Indicator (CQI). According to another example, a radio signature can comprise propagation times of a signal carrying a message exchanged between a terminal 70 and a base station 81. The choice of a particular method for determining a radio signature is merely an alternative embodiment of the invention.

To estimate the geographical position of a terminal 70$i$ of interest, the geolocation method uses a set of reference elements. Each reference element comprises a radio signature associated with a geographical position. To construct the set of reference elements, it is for example possible to use certain terminals 70 of the wireless communication system 60, called "calibration terminals 70*c*", which have a positioning system, for example a GPS receiver, which allows to obtain with precision the geographical position of the terminal 70*c*.

Conventionally, this reference set is for example a database memorized in the server 82 and used by a machine learning algorithm. Each reference element stored in this database is a pair of pieces of information consisting on the one hand of a radio signature, and on the other hand of a known geographical position associated with this radio signature. The radio signature and the known geographical position of a reference element is obtained on the basis of a calibration terminal 70*c*. The machine learning algorithm thus allows to estimate the position of a terminal 70*i* of interest on the basis of a radio signature of said terminal 70*i* of interest, and using the database.

Figure 2:
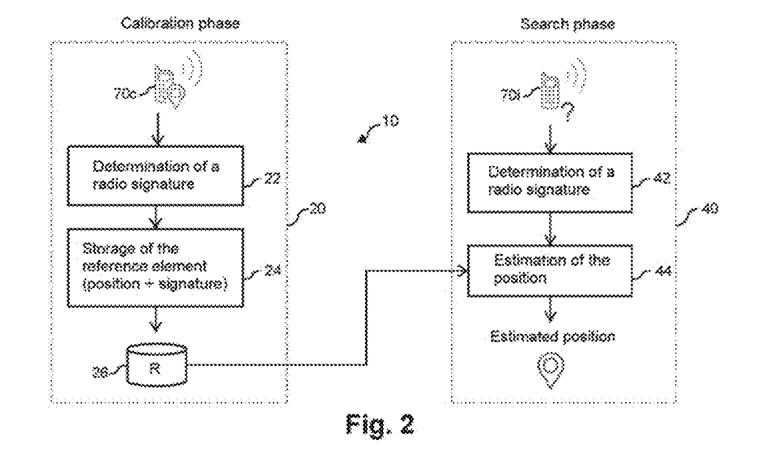
FIG. 2: the main steps of a conventional geolocation method.

FIG. 2 shows the main steps of such a geolocation method 10.

The goal of a first calibration phase 20 is to create a sort of radio map of the geographical zone to be covered. This phase comprises:
- a step 22 of determining radio signatures respectively associated with geographical positions,
- a step 24 of storing the reference element obtained (associated of a radio signature and of a geographical position) in a set 26 of reference elements.

The step 22 of determining a radio signature involves for example the emission by a calibration terminal 70*c* of a message containing the current geographical position to the access network 80 of the wireless communication system 60.

It should be noted that this message can be emitted independently of the geolocation method 10. For example, it can be a conventional message for remotely reading information comprising the current geographical position and not having the main goal of participating in the calibration phase 20 of the geolocation method 10.

The base stations 81 of the access network 80 that have received the signal containing said message thus carry out a measurement of the RSSI level at which the message was received and transmit the message and additional information (RSSI level, date of reception of the message, identifier of the base station, etc.) to the server 82.

The server 82 collects the RSSI levels measured by the various base stations 81 and comprises them in the radio signature thus determined for the calibration terminal 70*c*.

It should be noted that several methods are possible for the choice of the base stations to take into account for the formation of a radio signature. According to a first example, all the base stations of the wireless communication system 60 are considered. According to another example, it is possible to limit the number of base stations to take into account, for example according to a limited geographical zone of interest.

The server 82 also carries out the extraction of the current geographical position contained in the message emitted by the calibration terminal 70*c* and transmitted to the server 82 by the base stations 81 that received it.

Finally, the pair of pieces of information formed by the geographical position of the calibration terminal 70*c* and the associated radio signature is added to the set 26 of reference elements through the storage step 24. The server 82 comprises for example a set of hardware and software means for memorizing the reference elements in a database.

In specific embodiments, the steps of the calibration phase 20 described above are repeated for a predefined duration, for example for several days, or even several weeks or several months, for calibration terminals 70*c* of the wireless communication system 60, in order to obtain a set 26 of reference elements containing a significant amount of information, that is to say a precise map of the zone to be covered. In one alternative, the steps of the calibration phase 20 are repeated until a predefined number of reference elements are obtained in the set 26.

In a preferred embodiment, the set 26 of reference data is continually enriched by new reference elements coming from the calibration terminals 70*c*.

Then, a search phase 40 comprises:
- a step 42 of determining a radio signature for a terminal 70*i* of interest located at a geographical position to be estimated,
- a step 44 of estimating the geographical position of said terminal 70*i* of interest on the basis of the radio signature determined and the set 26 of reference elements acquired during the calibration phase 20.

The step 42 of determining a radio signature involves for example the emission of a message by a terminal 70*i* of interest to the access network 80 of the wireless communication system 60. This message can be any message emitted independently of the method 10 for geolocating the terminal. For example, this message can be emitted for purposes of remote reading of information that has nothing to do with the geolocation of the terminal 70. Alternatively, this message can be emitted intentionally with the goal of geolocating the terminal 70. In all cases, the contents of the message are not necessarily of importance in the search phase 40.

Similar to what is carried out for the calibration phase 20, the base stations 81 of the access network 80 that have received said message carry out a measurement of the RSSI level of the signal carrying the message.

The server 82 thus collects the RSSI levels measured by the various base stations 81 and comprises them in the radio signature thus determined for the terminal 70*i* of interest.

The estimation 44 of the geographical position of the terminal 70*i* of interest having emitted the message is thus carried out, for example using a regression machine learning algorithm, on the basis on the one hand of the set 26 of reference elements, and on the other hand of the radio signature determined for the terminal 70*i* of interest, the geographical position of which must be estimated.

The geolocation method 10 described above has, however, mediocre performance in terms of geolocation precision and it is particularly complex (that is to say that it requires significant capacities and calculation times), in particular in the case in which the geographical zone to be covered is vast, for example if an entire country, or even a continent, must be covered.

2. The Principle of the Invention

To improve the precision and/or to simplify the complexity of the geolocation method 10, the present invention is based on the idea that the terminals 70 of the system considered can move in groups. The invention thus proposes a method 10 for geolocating a terminal 70*i* of interest that takes advantage of the information provided by other terminals 70 which have moved together with the terminal 70*i* of interest during a certain period.

Figure 3:
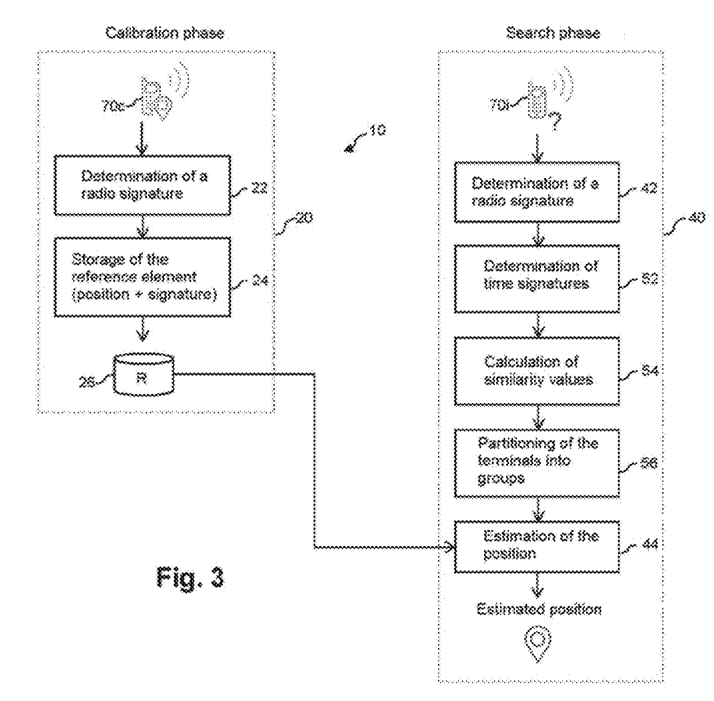
FIG. 3: the main steps of a geolocation method according to the invention.

FIG. 3 shows the main steps of a specific embodiment of a geolocation method 10 according to the invention. It should be noted that the order of the various steps shown in FIG. 3 is given only for informational purposes, for reasons of clarity of the drawing, and must not be considered to be limiting the invention.

For the geolocation method 10 in question and presently described as an example, the calibration phase 20 is similar to that described above in reference to FIG. 2. The search phase 40 comprises, however, additional steps that aim to form groups of terminals 70, each group comprising terminals 70 for which it is considered that they have moved together during a certain current period of observation up to the time of estimation of the position of the terminal 70i of interest.

The search phase 40 comprises a step 42 of determining a radio signature for a terminal 70i of interest, the geographical position of which is desired to be estimated. This step is similar to that described above in reference to FIG. 2.

The search phase 40 also comprises a step 52 of determining, for each terminal 70 of a panel of terminals 70 of the wireless communication system 60, a time signature. The time signature of a terminal 70 comprises values measured independently by said terminal 70 by at least one sensor of the terminal 70 during a past period of observation, the duration of which is predetermined according to the use considered. These values correspond to data related to the environment in which the terminal 70 moved or related to the behavior that the terminal 70 had during said period of observation.

The search phase 40 also comprises a step 54 of calculating values of a criterion of similarity between the time signatures of the terminals 70 of the panel. If two time signatures for two terminals 70 have significant similarities, this means that the two terminals 70 in question probably moved together, or possibly that they remained in the same location, during the observation period.

The search phase 40 also comprises a step 56 of partitioning the various terminals 70 of the panel into various groups according to the similarity criterion.

Finally, the search phase 40 comprises a step 44 of estimating the geographical position of the terminal 70i of interest according to geolocation data available for at least one other terminal 70 of a group, called "group of interest", to which the terminal 70i of interest belongs.

The various steps of the search phase 40 are described below in detail.

3. Determination of a Time Signature

Various methods are possible for the step 52 of determining a time signature of a terminal 70 of the panel considered.

In a specific embodiment, the time signature of a terminal 70 comprises values representative of the phases of mobility of said terminal 70 during the period of observation. The phases of mobility are for example determined using measurements carried out by a motion sensor of the terminal 70 such as an accelerometer, or on the basis of sensors allowing to measure values of the environment of the terminal (temperature, atmospheric pressure, luminosity, magnetic field, etc.).

"Phases of mobility" means a time interval during which the terminal 70 is considered to be moving. Two successive phases of mobility are separated by a phase of immobility, which corresponds to a time interval during which the terminal is considered to be immobile.

Figure 4:
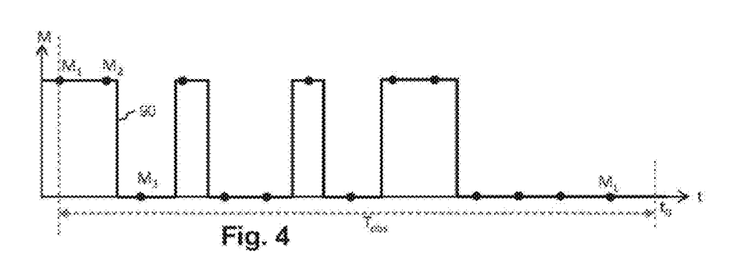
FIG. 4: a diagram of phases of mobility determined by a terminal.

FIG. 4 schematically shows phases of mobility of a terminal 70 of the wireless communication system 60 during a period of observation $T_{obs}$. The period of observation $T_{obs}$ precedes a time to corresponding for example to the time at which the geographical position of a terminal 70i of interest is estimated by the geolocation method 10. The time to generally corresponds to a time of reception of a message emitted by the terminal 70i of interest, on the basis of which message a radio signature of the terminal 70i of interest is determined in step 42 of the search phase 40.

The curve 90 of FIG. 4 represents the phases of mobility of the terminal 70. When the curve 90 takes on a non-zero constant value (for example the value 1), this means that the terminal 70 is moving (it is in a phase of mobility). When the curve takes on a null value (value 0), this means that the terminal 70 is immobile (it is in a phase of immobility).

The curve 90 can be constructed, for example by the server 82, using information passed on by the terminal 70 in messages emitted to the access network 80.

For this purpose, the terminal 70 comprises a motion sensor, for example an accelerometer, and a set of conventional means configured as software (computer program product) and/or hardware (one or more programmable logic circuits of the FPGA type and/or one or more specialized integrated circuits of the ASIC type, etc.) to determine respective start times and end times of phases of mobility of the terminal 70. For example, a measurement of acceleration is carried out recurrently by the sensor (for example with a period between several tens of milliseconds and several hundred milliseconds) and if the measured value is greater than a predetermined motion-detection threshold, a current time of detection is memorized and compared to the previous time of detection. If the two detection times are separated by a duration smaller than a predetermined threshold of detection of a new phase of mobility, then it is considered that the two detection times belong to the same phase of mobility. If, however, the two detection times are separated by a duration greater than the threshold of detection of a new phase of mobility, then it is considered that the previous detection time corresponds to the end time of a phase of mobility, and the current detection time corresponds to the start time of a new phase of mobility.

The start times and end times of the phases of mobility of the terminal 70 are for example memorized then sent to the server 82 in messages emitted recurrently by the terminal 70 to the access network 80. Such messages can for example be emitted periodically, or upon each detection of a new phase of mobility.

On the basis of the curve 90, the server 82 can determine a time signature for the terminal 70 for the period of observation $T_{obs}$, for example by sampling a set of values $(M_1, M_2, M_3, \ldots, M_L)$. The sampling period is chosen in a suitable manner according to the typical durations of the phases of mobility and of the phases of immobility of the terminal 70 for the use considered. For a fixed period of observation, the greater the number L of values, the more information there is on the movements carried out by the terminal 70, and the more precise the time signature.

By using the same sampling over the same period of observation for all the terminals 70 of the panel considered, it is thus possible to compare the time signatures of the various terminals 70 two by two. If two terminals 70 have similar time signatures this means that they had similar phases of mobility during the period of observation, and consequently this means that they probably moved together.

Figure 5:
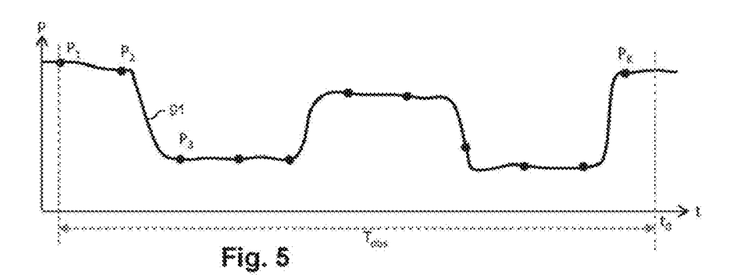
FIG. 5: a diagram of the atmospheric pressure measured by a terminal.

In a specific embodiment, the time signature of a terminal 70 comprises values representative of the atmospheric pressure to which said terminal 70 is subjected. These values are for example measured by an atmospheric-pressure sensor of the terminal 70.

FIG. 5 shows a curve 91 of the change in the atmospheric pressure to which a terminal 70 is subjected during a period of observation $T_{obs}$ preceding a time to of estimation of the geographical position of a terminal 70i of interest.

The curve 91 is for example constructed by the server 82 using atmospheric-pressure measurements carried out by the terminal 70 and sent to the server 82 in messages emitted to the access network 80 recurrently.

On the basis of the curve 91, the server 82 can determine a time signature for the terminal 70 for the period of observation $T_{obs}$, for example by sampling a set of values ($P_1, P_2, P_3, \ldots, P_K$). Here again, the sampling period (and thus the number K of values sampled during the period of observation $T_{obs}$) is chosen in a suitable manner according to the use considered.

For example, if palettes of merchandise equipped with terminals 70 are transported by airplane, it is of interest to distinguish phases of aerial transport corresponding to the periods during which the atmospheric pressure is low (because of the high altitude of the airplane) and phases on the ground corresponding to the periods during which the atmospheric pressure is higher. The sampling period can thus be chosen according to the typical durations of the phases of aerial transport and of the phases on the ground.

By using the same sampling over the same period of observation for all the terminals 70 of the panel considered, it is thus possible to compare the time signatures of the various terminals 70 two by two. If two terminals 70 have similar time signatures this means that they had similar phases of aerial transport during the period of observation, and consequently this means that they probably moved together.

It should be noted that other methods are possible for determining a time signature on the basis of the curve 91. For example, it is possible to cut the period of observation $T_{obs}$ up into various time intervals, and to determine a value for each of the intervals, such as the average value taken on by the curve 91 over a time interval, or the minimum value or the maximum value.

Figure 6:
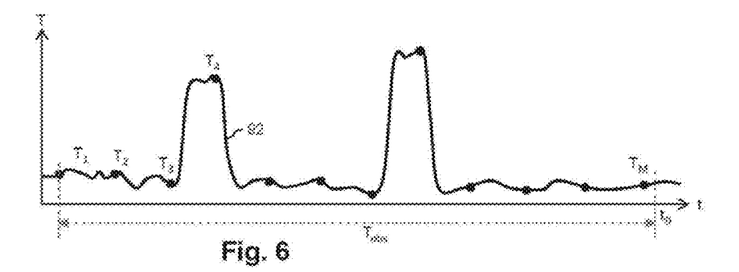
FIG. 6: a diagram of the temperature measured by a terminal.

In a specific embodiment, the time signature of a terminal 70 comprises values representative of the temperature to which said terminal 70 is subjected. These values are for example measured by a temperature sensor of the terminal 70.

FIG. 6 shows a curve 92 of the change in the temperature to which a terminal 70 is subjected during a period of observation $T_{obs}$ preceding a time to of estimation of the geographical position of a terminal 70i of interest.

The curve 92 is for example constructed by the server 82 using temperature measurements carried out by the terminal 70 and sent to the server 82 in messages emitted to the access network 80.

On the basis of the curve 92, the server 82 can determine a time signature for the terminal 70 for the period of observation $T_{obs}$, for example by sampling a set of values ($T_1, T_2, T_3, \ldots, T_M$). Here again, the sampling period is chosen in a suitable manner according to the use considered.

For example, if palettes of merchandise equipped with terminals 70 are transported by a refrigerator truck, it is of interest to distinguish phases during which the temperature is low (palettes located in cold storage or in a refrigerator truck) and phases during which the temperature is higher (palettes being loaded or unloaded from a refrigerator truck). The sampling period is thus for example chosen according to the typical durations of the phases during which the temperature is high.

By using the same sampling over the same period of observation for all the terminals 70 of the panel considered, it is thus possible to compare the time signatures of the various terminals two by two. If two terminals have similar time signatures this means that they were subjected to similar changes in temperature during the period of observation, and consequently this means that they probably moved together.

Figure 7:
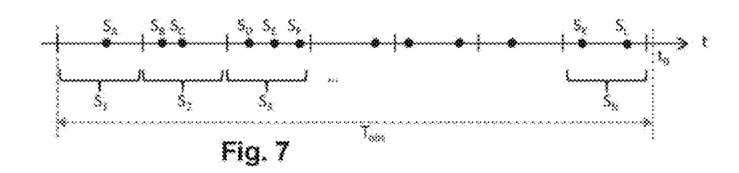
FIG. 7: a diagram of radio signatures determined for a terminal.

In a specific embodiment, the time signature of a terminal 70 comprises radio signatures determined for said terminal 70 at various times during the period of observation.

FIG. 7 schematically shows radio signatures $S_A$, $S_B, S_C, \ldots, S_L$ determined during an observation period $T_{obs}$ preceding a time to of estimation of the geographical position of a terminal 70i of interest. Each radio signature is for example determined on the basis of RSSI measurements carried out by base stations 81 of the wireless communication system 60 upon the reception of messages emitted by the terminal 70 at various times during the period of observation $T_{obs}$.

It is for example possible to determine a time signature for the terminal 70 by dividing the period of observation $T_{obs}$ into N time intervals having an identical duration, and by defining a radio signature $S_1, S_2, \ldots, S_N$ for each of said time intervals according to the radio signatures $S_A$, $S_B, \ldots, S_L$ belonging to said time interval. Each component of a radio signature $S_1, S_2, \ldots, S_N$ is for example defined as the average (or maximum, minimum, etc.) value of the RSSI values of the corresponding components of the radio signatures $S_A$, $S_B$, $S_L$ belonging to the corresponding time interval. For example, in FIG. 7, the radio signature $S_3$ corresponding to the third time interval of the period of observation $T_{obs}$ comprises a set of values ($RSSI_{3,1}$, $RSSI_{3,2}, \ldots, RSSI_{3,Q}$), and each component $RSSI_{3,i}$ is equal to the average of the corresponding components $RSSI_{D,i}$, $RSSI_{E,i}$, and $RSSI_{F,i}$ of the radio signatures $S_D$, $S_E$ and $S_F$, respectively. The time signature for the terminal 70 during the period of observation $T_{obs}$ is thus the set of values ($S_1$, $S_2, S_3, \ldots, S_N$). A measurement time $t_i$ corresponding to the time located in the middle of the time interval used to determine $S_i$ is for example associated with each radio signature $S_i$, $i \in \{1 \ldots N\}$.

By doing the same for all the terminals 70 of the panel considered, it is thus possible to compare the time signatures of the various terminals two by two. If two terminals have similar time signatures this means that they were faced with similar radio conditions during the period of observation, and consequently this means that they probably moved together.

It should be noted that instead of using distinct time intervals to define the radio signatures $S_1, S_2, \ldots, S_N$, it is possible to use a sliding time window mechanism for which a radio signature $S_A$, $S_B, \ldots, S_L$ is involved for several positions of said sliding window. Each radio signature $S_1$, $S_2, \ldots, S_N$ of the time signature thus corresponds to a convolution between the position of the sliding window and the radio signatures $S_A$, $S_B, \ldots, S_L$.

It should also be noted that other environmental measurements could be used to define the time signature of a terminal 70, such as a level of luminosity, an intensity of magnetic field, etc. The choice of a particular type of measurement to define a time signature is merely an alternative embodiment of the invention.

In specific embodiments, the time signature of a terminal 70 is a combination of several sets of values corresponding to different environmental measurements. For example, the time signature of a terminal 70 comprises both the values ($M_1, M_2, M_3, \ldots, M_L$) described in reference to FIG. 4 and the values ($S_1, S_2, S_3, \ldots, S_N$) described in reference to FIG. 7.

4. Determination of a Similarity Criterion

Various methods are possible for the step 54 of calculating values of a criterion of similarity between the time signatures of the terminals 70 of the panel considered.

The case is considered in which the time signature of a terminal 70 comprises the values $(M_1, M_2, M_3, \ldots, M_L)$ described in reference to FIG. 4 representative of the phases of mobility of said terminal 70 during the period of observation $T_{obs}$. As a reminder, each value $M_i$ is respectively equal to 1 or 0 according to whether or not the terminal 70 is in a phase of mobility at a time $t_i$.

If two different terminals 70, noted as A and B, and respectively having the time signatures $(M_1, M_2, \ldots, M_L)$ and $(M_1', M_2', \ldots, M_L')$, are considered, it is for example possible to define a criterion of similarity, noted as $SIM_M(A,B)$, between the two time signatures by the following formulas:

$$SIM_M(A,B) = \sum_{i=1}^{L} W_i \cdot D^{-1}(M_i, M_i') \quad (1)$$

$$W_i = e^{-(t_0 - t_i)} \quad (2)$$

$$D^{-1}(M_i, M_i') = C \cdot M_i \cdot M_i' \quad (3)$$

In formula (3), C is a constant defined for example according to the number L and a desired order of magnitude for $SIM_M(A,B)$ (which in this case takes its values between 0 and L×C).

In the formula (2), $t_i$ corresponds to the time associated with the measurements $M_i$ and $M_i'$. The term $W_i$ is thus a weighting factor that allows to give more importance to recent measurements. This is advantageous for example if two terminals have moved together for only a part of the period of observation. In this case, more importance should be given to the recent data in order to determine whether or not at the end of the period of observation, that it to say at the time to at which the estimation of the geographical position of the terminal 70i of interest is carried out, the terminals in question are together, that is to say whether or not it should be considered that they belong to the same group.

Thus, a high value for $SIM_M(A,B)$ means that the time signatures of the terminals A and B over the period of observation $T_{obs}$ are similar, which means that there is a high probability that the terminals A and B have moved together during the period of observation, and more particularly towards the end of the period of observation.

The case is now considered as described in reference to FIG. 6, in which the time signature of a terminal 70 comprises temperature values; it is for example possible to define a criterion of similarity, noted as $SIM_T(A,B)$, between the two time signatures of two terminals A and B by using the following formulas:

$$SIM_T(A,B) = \sum_{i=1}^{M} W_i \cdot D^{-1}(T_i, T_i') \quad (4)$$

$$W_i = e^{-(t_0 - t_i)} \quad (5)$$

$$D^{-1}(T_i, T_i') = \frac{1}{\max(|T_i - T_i'|, sat)} \quad (6)$$

The term sat in the formula (6) is a constant with a low value (for example equal to 0.5° C. for the example in question) intended to avoid a division by 0 in the case in which the same temperature is measured for the two terminals A and B at the time $t_i$.

The case is now considered as described in FIG. 7, in which the time signature of a terminal 70 comprises radio signatures. For example two different terminals 70, noted as A and B, and respectively having the time signatures $(S_1, S_2, \ldots, S_N)$ and $(S_1', S_2', \ldots, S_N')$, are considered. Each radio signature $S_i$ determine at a time $t_i$ corresponds to a set of RSSI levels $(RSSI_{i,1}, RSSI_{i,2}, \ldots, RSSI_{i,Q})$ measured by a number Q of base stations 81.

It is for example possible to define a criterion of similarity, noted as $SIM_S(A,B)$, between the two time signatures by the following formulas:

$$SIM_S(A,B) = \sum_{i=1}^{N} W_i \cdot D^{-1}(S_i, S_i') \quad (7)$$

$$W_i = e^{-(t_0 - t_i)} \quad (8)$$

$$D^{-1}(S_i, S_i') = \frac{1}{\max\left(\sum_{j=1}^{Q} |RSSI_{i,j} - RSSI_{i,j}'|, sat\right)} \quad (9)$$

In the formula (9), the term sat is a constant used to avoid a division by 0 and thus limit the value of $SIM_S(A,B)$.

In the formulas (3), (6) and (9), the function $D^{-1}$ represents the inverse of a distance separating two components of a time signature. It should be noted that other functions could be chosen to define such a distance. Likewise, other functions could be chosen to define a weighting factor $W_i$ according to the time that has passed. Such a choice is merely an alternative embodiment of the invention.

In a specific embodiment, the time signature of a terminal 70 comprises both the values representative of the phases of mobility of the terminal 70 (such as those described in reference to FIG. 4) and radio signatures of the terminal determined at various times during the period of observation (such as those described in reference to FIG. 7). A similarity criterion SIM(A,B) can thus for example be defined as a convex combination of a similarity criterion $SIM_M(A,B)$ for the phases of mobility and of a similarity criterion $SIM_S(A,B)$ for the radio signatures:

$$SIM(A,B) = \beta \cdot SIM_M(A,B) + (1 - \beta) \cdot SIM_S(A,B) \quad (10)$$

$$\beta = \frac{1}{M \cdot b} \cdot \sum_{i=1}^{M} M_i \cdot M_i' \cdot e^{-\frac{(t_0 - t_i)}{b^2}} \quad (11)$$

In the formula (11), M is the number of values $M_i$ and $M_i'$ in the time signatures representative of the phases of mobility of the terminals A and B, and b is a positive constant value. As a reminder, each value $M_i$ is respectively equal to 1 or 0 according to whether or not the terminal 70 is in a phase of mobility at a time $t_i$.

Thus, the factor $\beta$ takes on a greater value if the terminals A and B had similar phases of mobility at times close to $t_0$, and it takes on a low value in the opposite case. $\beta$ thus acts as a weighting factor in the calculation of SIM(A,B) by giving more importance to $SIM_M(A,B)$ with respect to $SIM_S(A,B)$ when the terminals A and B have moved together at times closes to $t_0$. On the contrary, the factor gives more importance to $SIM_S(A,B)$ with respect to $SIM_M(A,B)$ when the terminals A and B have not had similar phases of mobility at times close to $t_0$. It is thus possible to give more or less importance to the similarities related to the phases of mobility with respect to those related to the radio environment according to whether or not the terminals have had similar phases of mobility recently with respect to the time to of estimation of the position of a terminal 70i of interest.

5. Partitioning of the Terminals

Various methods are possible for step 56 of partitioning 56 the terminals 70 of the panel considered into various groups according to the similarity criterion or criteria previously determined.

The goal of this step is to determine groups of terminals that have a high probability of having moved together during the period of observation $T_{obs}$ preceding the time to of estimation of the geographical position of a terminal 70i of interest. This thus involves grouping together terminals 70 for which the values of similarity tow by two are particularly high.

There are several known methods for dividing the terminals 70 of the panel considered into various homogenous groups, in the sense that the terminals 70 of each group share similarities (that is to say that the value of the criterion of similarity between two terminals of the same group is relatively large).

For example, the so-called "centroid" methods such as the "k-means" or "k-medoids" algorithms define particular points of the space of the measurement considered, called "central points", which maximize the similarity between a central point and the terminals 70 of the group. Such methods generally associate a terminal 70 with one group at most (hard clustering methods). If a terminal 70 does not have sufficient similarity with other terminals 70 of the panel, it is not associated with any group and remains isolated.

In one alternative, certain partitioning methods associate a terminal 70 with several groups according to a certain degree corresponding to a probability of said terminal 70 belonging to a group (soft clustering methods).

In embodiments in which the time signature of a terminal 70 is a combination of two independent sets of values, such as the combination of values representative of phases of mobility and of radio signatures, several methods are possible to carry out the partitioning.

According to a first example, the partitioning is carried out according to a single similarity criterion taking into account the two sets, such as that defined above for the formula (10).

According to a second example, a partitioning can be carried out for each independent set according to a similarity criterion that is specific to it, and a consensus can be made between the various partitioning obtained.

A third example is based on a "conditional independence" between partitioning carried out according to similarity criteria that are specific to each set. For example, a partitioning is carried out for one of the two sets on the basis of a similarity criterion SIM/that is specific to it. For example, for a terminal A, a vector $P_A=(p_{A1}, p_{A2}, p_{A3}, \ldots, p_{AK})$ where $p_{Ai}$ represents the probability of the terminal A belonging to the group having the index i is obtained. Then, the values taken by a similarity criterion $SIM_2$ specific to the other set are modified according to the partitioning obtained, for example as follows:

$$SIM_2(A, B) = \begin{cases} 0 & \text{if } P_A^T \cdot P_B \leq p_c \\ SIM_2(A, B) & \text{otherwise} \end{cases} \quad (12)$$

where $p_c$ is a predetermined threshold. Then a final partitioning is carried out on the basis of the similarity values thus modified for the criterion $SIM_2$.

The methods presented above to carry out a partitioning 56 of the terminals 70 of the panel have been given as examples that are in no way limiting. Other methods are possible, and the choice of a particular method is merely an alternative of the invention.

6. Determination of a Panel of Terminals

The panel to be considered for the steps 52, 54 and 56 can for example be determined by a selection of the terminals 70 of the wireless communication system 60 for which it is known a priori that they are close (geographically speaking) to the terminal 70i of interest, or that they have a certain propensity to belong to a group of several terminals 70.

In specific embodiments, only the terminals 70 which, during the emission of their last message before the time to, were covered by at least one base station 81 of the wireless communication system 60 that also covers the terminal 70i of interest at the time to are selected.

In specific embodiments, BS designates the set of the $N_{bs}$ base stations 81 that received the message emitted by the terminal 70i of interest at the time $t_0$, $N_{mvt}(A)$ designates the number of phases of mobility of a terminal A during the period of observation $T_{obs}$, and the following is for example defined:

$$P_{radio}(A) = N_{bs}\sqrt{\prod_{bs \in BS}\left(\sum_{B \neq A}\frac{1}{\max(|RSSI_{A,bs} - RSSI_{B,bs}|, sat)}\right)} \quad (13)$$

$$P_{mvt}(A) = \frac{1}{\sigma \cdot \sqrt{2\pi}} \cdot e^{-\Sigma_{B \neq A}\frac{(N_{mvt}(A)-N_{mvt}(B))^2}{2\sigma^2}} \quad (14)$$

$$P_{tot}(A) = \sqrt{P_{radio}(A) \cdot P_{mvt}(A)} \quad (15)$$

Only the terminals for which $P_{tot}(A)$ is greater than a predetermined threshold are thus selected in the panel.

In the formula (13), $RSSI_{X,bs}$, $bs \in BS$, is the RSSI level measured by the base station bs for the last message emitted by a terminal X before $t_0$. $P_{radio}(A)$ is thus a value representative of a probability of a terminal A finding, among other terminals 70 of the system 60, terminals 70 having a radio environment close to that of the terminal A.

In the formula (14), a corresponds for example to the standard deviation of the values $N_{mvt}(X)$. $P_{mvt}(A)$ is thus a value representative of a probability of a terminal A finding, among other terminals 70 of the system 60, terminals 70 having a number of phases of mobility during the period $T_{obs}$ close to that of the terminal A.

The term $P_{tot}(A)$ defined by the formula (15) thus represents a propensity for a terminal A of finding, among other terminals 70 of the system 60, terminals 70 that have been subjected to similar conditions in terms of radio environment and in terms of movements. In other words, the greater $P_{tot}(A)$, the greater the probability of being able to group the terminal A with other terminals 70 of the system 60.

It should be noted that the methods presented above for determining a panel of terminals 70 have been given as examples that are in no way limiting. Thus, the choice of a particular method is merely an alternative of the present invention.

7. Estimation of the Geographical Position of a Terminal of Interest

The search phase 40 of the geolocation method 10 according to the invention comprises a step 44 of estimating the geographical position of the terminal 70i of interest according to geolocation data available for at least one other terminal 70 of a group, called "group of interest", to which the terminal 70i of interest belongs.

In the rest of the description, as an example that is in no way limiting, it is considered that the time signature of a terminal 70 is a combination of values representative of the phases of mobility and of radio signatures of said terminal 70 during a period of observation $T_{obs}$ preceding a time to of estimation of the position of the terminal 70i of interest. Advantageously, it is considered that the time to corresponds to a time of reception by the server 82 of a message emitted by said terminal 70i of interest during a phase of immobility.

It is also considered that a panel of terminals 70 is determined according to any one of the methods described above.

It is also considered that a similarity criterion such as that described above by the formula (10) is used to carry out a partitioning of the terminals 70 of the panel.

It is also considered that a geographical position of a terminal 70 of the panel can be estimated by using for example a conventional geolocation algorithm such as that described in reference to FIG. 2. As already mentioned above, such an estimation of the geographical position can be complex and relatively imprecise, in particular when the geographical zone to be covered is vast and/or the number of terminals and/or of base stations is high.

The rest of the description presents, as non-limiting examples, several methods for estimating with more precision and/or with less complexity the geographical position of the terminal 70i of interest using the partitioning obtained and geolocation data provided by one or more terminals 70 of the group of interest, or even of other groups.

In specific embodiments, the geolocation data is GPS positions provided by calibration terminals 70c equipped with a GPS receiver.

According to a first example, the terminal 70i of interest is associated with a single group ("hard clustering" method), and at least one calibration terminal 70c belonging to this group has provided its GPS position via a message sent to the access network 80 at a time preceding to since which it has not moved. The geographical position of the terminal 70i of interest is thus associated with said GPS position (or with an average of several GPS positions available for the group).

According to a second example, the terminal 70i of interest is associated with several groups with a certain probability of belonging to each group ("soft clustering" method), and a geographical position is attributed to each group on the basis of at least one GPS position provided by a calibration terminal 70c of said group (or optionally by averaging several GPS positions available for the group). $X_k$ is the geographical position attributed to a group k, $x_j^k$ the GPS position of a calibration terminal 70c noted as j of a group k, and $p_{jk}$ the probability of the terminal j belonging to the group k. Thus, the position $Y_i$ of a terminal 70i of interest noted as i is determined according to the geographical positions attributed to the groups and according to the probabilities of the terminal 70i of interest belonging to the various groups according to the following formulas:

$$X_k = \frac{\sum_j p_{jk} \cdot x_j^k}{\sum_j p_{jk}} \quad (16)$$

$$Y_i = \frac{\sum_k p_{ik} \cdot X_k}{\sum_k p_{ik}} \quad (17)$$

In specific embodiments, the geolocation data is geographical positions of terminals 70 estimated by a conventional geolocation algorithm such as that descried in reference to FIG. 2. Preferably, said geographical positions are estimated on the basis of messages emitted at times relatively close to $t_0$ starting from which the terminals 70 have no longer moved.

For example, the terminal 70i of interest is associated with a single group ("hard clustering") and the geographical position of the terminal 70i of interest is determined according to one or more estimated geographical positions of the other terminals 70 of this group, for example by averaging the estimated geographical positions of the various terminals 70 of the group, optionally while eliminating certain estimated positions judged to be aberrant with respect to the others, or while favoring certain estimated geographical position with respect to others according to the RSSI levels of the associated radio signatures, etc.

According to another example, the terminal 70i of interest is associated with several groups with a certain probability of belonging to each group ("soft clustering"), and a geographical position is attributed to each group on the basis of the estimated geographical positions of the terminals 70 of said group, then the geographical position of the terminal 70i of interest is estimated in a manner similar to the method previously described using the formula (17).

In specific embodiments, the terminal 70i of interest is associated with a single group ("hard clustering") and the geolocation data is radio signatures of terminals 70. Preferably, said radio signatures are determined on the basis of messages emitted at times relatively close to $t_0$ starting from which the terminals 70 have no longer moved. A virtual radio signature is thus determined for the group to which the terminal 70i of interest belongs, for example by averaging each component of the radio signatures, or by taking for each component the maximum value of the radio signatures, etc. The geographical position of the terminal 70i of interest is thus estimated in a conventional manner on the basis of the virtual radio signature and the set 26 of reference elements.

It should be noted that in the very particular case in which the terminal 70i of interest does not belong to any group, for example because it does not have sufficient similarity with other terminals 70 of the panel, a mediocre estimation of the geographical position which does not take advantage of the information related to the partitioning must suffice.

8. Conclusion

The above description clearly illustrates that, by its various features and their advantages, the present invention achieves the goals set.

In particular, the geolocation method according to the invention provides a gain in terms of geolocation precision with respect to the methods according to the prior art.

Indeed, in certain embodiments, the position of a terminal 70i of interest can be determined directly on the basis of one or more GPS positions of calibration terminals 70c belonging to the group to which the terminal 70i of interest belongs.

In other embodiments, GPS data is not available to estimate the position of a terminal of interest, and geographical positions of other terminals 70 of the system estimated by a conventional geolocation method on the basis of radio signatures should thus for example be used as geolocation data. Even in this case, the precision of geolocation of a terminal 70*i* of interest is greatly improved with respect to a conventional method via the correlation of the various information available for the terminals 70 belonging to the group to which the terminal 70*i* of interest belongs.

The invention is particularly well adapted when the geographical zone to be covered is vast (for example if a city, a country, or even a continent must be covered) and/or the number of terminals is high (for example several thousand to several hundred thousand terminals) and/or the number of base stations is high (for example several tens, or even several hundred, or even several thousand base stations).

The complexity of the geolocation method is also improved in terms of time and calculation capability. For example, it is possible to determine the geographical position of all the terminals 70 of a group by attributing to them the same geographical position (corresponding to a geographical position of the group) estimated on the basis of the geographical position of only one terminal or several terminals belonging to said group.

In general, it should be noted that the embodiments considered above have been described as non-limiting examples, and that other alternatives are consequently possible.

In particular, several methods exist for determining a radio signature for a terminal 70: on the basis of RSSI levels of a signal exchanged between the terminal 70 and a base station 81, on the basis of a propagation time of a signal exchanged between the terminal 70 and a base station 81, etc. The choice of a particular method is merely an alternative of the invention.

Also, several methods exist for determining a time signature for a terminal 70. The choice of a particular type of measurement (detection of phases of mobility, values of temperature, of pressure, etc.) is merely an alternative of the invention.

Likewise, several methods exist for determining a criterion of similarity between two time signatures. The choice of a particular method is merely an alternative of the invention.

Several methods are also possible for partitioning the terminals 70 into several groups according to a similarity criterion, or for determining a panel of terminals 70 to be partitioned. Here again, the choice of a particular method is merely an alternative of the invention.

Also, various types of geolocation data provided by certain terminals 70 of the system are possible. A GPS position of a terminal 70 has been given as an example of a piece of geolocation data, but other geolocation data is possible. For example, the MAC ("Medium Access Control") address of a Wi-Fi access point to which a terminal 70 is connected can act as a piece of geolocation data if the geographical position of said access point is known.

The concept of the invention can also be applied to the case of the geolocation of a single terminal 70*i* of interest over time, independently of other terminals 70 of the system 60. In the case for example in which no phase of mobility of the terminal 70*i* of interest is detected between two times $t_1$ and $t_2$ to which radio signatures $S_1$ and $S_2$ respectively correspond, if the two radio signatures $S_1$ and $S_2$ are similar, then they can both be used to estimate the same position of the terminal 70*i* of interest. By extension, a group of N≥2 radio signatures $S_1$ similar and determined at times $t_i$ (the index i varying from 1 to N) between which the terminal 70*i* of interest has not moved can be used. Such an approach can allow to improve the precision of the estimation of the geographical position of the terminal 70*i* of interest as well as correlate estimations carried out in the past. If, however, radio signatures are not similar, it can be supposed that a phase of mobility has been missed and a different geographical position for each radio signature should be estimated.

The invention has been described as an example while considered a wireless communication system 60 of the IoT type for a use in the field of logistics (transport of palettes equipped with terminals of the IoT communication system 60). Nothing, however, excludes, according to other examples, considering other wireless communication systems, such as mobile telephony networks, and other uses optionally in other industrial fields.

The invention claimed is:

1. A method for estimating a geographical position of a terminal of interest, from a panel of terminals of a wireless communication system, comprising:
    determining, for each terminal of the panel, a time signature comprising values representative of mobility phases of said each terminal measured independently by said each terminal by at least one sensor of said each terminal during a predetermined observation period;
    calculating values of a similarity criterion between the time signatures of the terminals of the panel, a value of the similarity criterion calculated for two terminals of the panel being representative of a probability of the two terminals moving together during the predetermined observation period;
    partitioning the terminals of the panel into groups according to the values of the similarity criterion; and
    estimating the geographical position of the terminal of interest according to geolocation data available for at least one other terminal of a group of interest to which the terminal of interest belongs.

2. The method of claim 1, wherein the values measured by said at least one sensor of said each terminal comprise at least one of the following:
    values measured by a motion sensor;
    values measured by a temperature sensor;
    values measured by an atmospheric-pressure sensor;
    values measured by a luminosity sensor; and
    values measured by a magnetic-field sensor.

3. The method of claim 2, wherein the time signature of said each terminal further comprises radio signatures comprising values representative of quality of radio links existing between said each terminal and one or more base stations of the wireless communication system at a plurality of times during the predetermined observation period, and wherein the similarity criterion is determined relative to the mobility phases and to the radio signatures.

4. The method of claim 1, wherein the similarity criterion is determined according to a weighting factor assigned to a measured value representative of a time between a time of measurement of the value and a time of estimation of the geographical position of the terminal of interest.

5. The method of claim 1, wherein the partitioning of the terminals of the panel is performed such that each terminal belongs at most to one group.

6. The method of claim 1, wherein the partitioning of the terminals of the panel is performed such that each terminal belongs to a group according to a value of a probability of belonging, the group of interest corresponding to a group for which the value of the probability of belonging of the terminal of interest is the greatest.

7. The method of to claim 6, wherein the geographical position of the terminal of interest is estimated according to the geolocation data available for the terminals belonging to the groups and according to the values of probability of belongings of the groups.

8. The method of claim 1, wherein the geolocation data of a terminal is a geographical position obtained by a satellite positioning system of the terminal.

9. The method of claim 1, wherein the geolocation data of a terminal is a radio signature comprising values representative of quality of radio links existing between the terminal and one or more base stations of the wireless communication system.

10. The method of claim 9, wherein a geographical position of the terminal is estimated according to the radio signature of the terminal and a reference set comprising radio signatures associated with known geographical positions.

11. The method of claim 9, further determining a virtual radio signature for the group of interest according to the radio signatures of terminals belonging to the group of interest; and estimating the geographical position of the terminal of interest according to the radio signature and the geolocation data available for said at least one other terminal of the group of interest.

12. The method of claim 1, wherein the terminals of the panel of are determined by selecting among a plurality of terminals of the wireless communication system such that said each terminal of the panel is covered by at least one base station of the wireless communication system covering the terminal of interest.

13. A wireless communication system comprising terminals and an access network comprising base stations and a server connected to the base stations, wherein the wireless communication system implements a method of claim 1 for geolocating a terminal of interest from a panel of terminals, the server being configured to:
- collect values representative of mobility phases of each terminal of the panel, measured independently by said each terminal by at least one sensor of said each terminal during a predetermined observation period;
- determine a time signature for said each terminal in accordance with the values collected;
- calculate values of a similarity criterion between the time signatures of the terminals of the panel, a value of the similarity criterion calculated for two terminals of the panel being representative of a probability of the two terminals moving together during the predetermined observation period;
- partition the terminals of the panel into groups according to the values of the similarity criterion; and
- estimate a geographical position of the terminal of interest according to geolocation data available for at least one other terminal of a group of interest to which the terminal of interest belongs.

\* \* \* \* \*